United States Patent

Hiatt et al.

[15] 3,686,372

[45] Aug. 22, 1972

[54] METHOD FOR MAKING CEMENT

[72] Inventors: John C. Hiatt, Brandon, Fla.; John P. Luker, Houston, Tex.

[73] Assignee: General Portland Cement Co., Dallas, Tex.

[22] Filed: Sept. 16, 1970

[21] Appl. No.: 72,880

[52] U.S. Cl. .............................................. 263/53 R
[51] Int. Cl. ................................................ C04b 7/38
[58] Field of Search ............................... 263/53, 539

[56] References Cited

UNITED STATES PATENTS 1,001,582  8/1911  Ellis ........................... 263/53

OTHER PUBLICATIONS p. 22–25 of July 6, 1970, Sports Illustrated article by Coles Phinizy entitled " Dredging Money from the Bank."

Primary Examiner—John J. Camby
Attorney—Richards, Harris & Hubbard

[57] ABSTRACT

In the process for making cement, especially Portland cement, the degree of grinding required for the calcareous reactant material can be decreased by using aragonite, a calcium carbonate bearing mineral.

29 Claims, No Drawings

METHOD FOR MAKING CEMENT

BACKGROUND OF THE INVENTION

This invention relates to an improved process for making cement, more particularly to an improved process for producing Portland cement, and most particularly to an improved method for making Portland cement in which at least a portion of the grinding step of the calcareous reactant material is not required.

Portland cement can be made by combining finely ground combinations of a calcareous material (for example, calcitic limestone or oyster shell), an argillaceous material (for example, clay or shale), and other reactant materials (such as iron ore, slag and silica sand). These finely ground reactant materials are fed dry or as an aqueous slurry to a rotary kiln. The kiln burns or reacts these materials at temperatures around 2700° F. to form a cement clinker. As the clinker exits from the kiln, it can be quenched, if desired, for example, by a stream of air or steam or by immersion in water. The clinker is then combined with predetermined amounts of gypsum (hydrated calcium sulfate) and ground to a finely divided powder. In addition to the gypsum, this powder is composed of lime, alumina, silica and iron oxide as tetracalciumaluminoferrate, tricalciumaluminate, tricalciumsilicate, and dicalciumsilicate. Trace amounts of other materials such as magnesia, sodium, potassium and sulfur are also present in combined form. The powder thus formed is generally known as Portland cement, and has the property of hardening slowly when mixed into a paste with water. The hardening or set time can be controlled by varying the amount of gypsum added when grinding the clinker.

As previously stated, the reactant materials are finely ground when fed to a kiln for burning. The reactant materials are usually ground by dry or wet grinding methods. In the wet grinding process, the calcareous material which has been previously partially broken up is mixed with water and introduced into a grinding unit, thus producing a finely ground material from a very coarse material. It has been thought that if the reactant materials are not ground to a very fine powder, the chemical reaction in the kiln will not completely occur. It will at least not reach the degree of completeness desired for good quality Portland cement. A guideline for the production of good Portland cement is that the clinker or ground clinker (excluding gypsum content) should contain an average of less than about 2.5 percent by weight free lime (CaO), preferably less than about 2.0 percent by weight free lime for a water quenched clinker, preferably less than about 1.5 percent by weight free lime for an air quenched clinker, and preferably less than 1.0 percent by weight free lime for an unquenched clinker. More than 2.5 percent by weight free lime in the final product will normally detrimentally affect the hydraulic and soundness properties of the Portland cement.

When a calcareous material, such as limestone, is utilized in the manufacture of Portland cement, it has been heretofore thought that in order to obtain levels of free lime below 2.5 percent by weight in the cement clinker, that at least 70percent by weight and preferably greater than 75 percent by weight of the ground calcareous material must be −200 mesh. Likewise, it has been thought that greater than about 97 percent by weight of the calcareous material must be −50 mesh. Significant quantities of power are expended in grinding the limestone to this fineness, in addition to the requirement of substantial capital investment. In the typical Portland cement plant a capital expenditure of about 1.6 million dollars is presently required for the grinding of limestone to the foregoing finenesses.

It is desirable to reduce the cost of grinding the calcareous component of a reactant mixture for Portland cement. It is, therefore, desirable to possess a material which does not require grinding or the degree of grinding heretofore thought necessary for the calcareous component of such a reactant mixture. Likewise, it is desirable to reduce the power requirements for grinding the calcareous component. In addition, it is desirable to reduce the capital investment required for grinding presently known calcareous materials.

SUMMARY OF THE INVENTION

It has been discovered that by utilizing aragonite as the calcareous component of the reactant mixture for Portland cement, this component need not be ground to the finenesses heretofore though necessary for conventional calcareous materials such as limestone. In fact, when the coarser particles are removed by screening, or other appropriate methods, aragonite can be introduced into a kiln directly without grinding, i.e., omitting the grinding step.

Therefore, the present invention provides a process for the production of cement comprising processing aragonite to a fineness less than that necessary to successfully burn calcitic materials to produce a cement clinker having a free lime content less than about 2.5 percent by weight and burning the aragonite as part of a reactant mixture containing an argillaceous material to produce a cement clinker having a free lime content less than about 2.5 percent by weight.

Prior to introducing the aragonite into the kiln, it can be separated into a portion composed of coarser particles and a portion composed of finer particles. The coarser particles can be ground and recombined with the finer particles and thereafter introduced into the kiln as part of the reactant mixture. Without any separation, aragonite can also be ground to a much lesser fineness than is required for conventional calcareous materials and successfully burned to produce Portland cement.

DESCRIPTION OF PREFERRED EMBODIMENTS

Aragonite differs from calcite, the naturally occurring form of calcium carbonate in limestone, in that it has an orthorhombic crystalline structure, a greater density (2.93 to 2.95 compared to 2.71 for calcite), and less distinct cleavage than has calcite. Aragonite occurs most commonly in beds of gypsum and of iron ore. A form of aragonite known as oolitic aragonite also occurs on the ocean floor in the Caribbean. Oolitic aragonite occurs in discrete grains which are essentially spherical in form, hence the name oolitic aragonite. The material as a marine deposit is unconsolidated and varies in grain size with varying amounts of shell fragments intermixed. A typical analysis of oolitic aragonite appears in table I.

TABLE I

ARAGONITE CHEMICAL ANALYSIS

| Composition | Percent by Weight |
|---|---|
| $CaCO_3$ (calculated) | 97.00 |
| $SiO_2$ | 0.04 |
| $Fe_2O_3$ | 0.02 |
| $Al_2O_3$ | 0.02 |
| MgO | 0.23 |
| Mn | 0.0005 to 0.005 |
| Sr | 0.1 to 1.0 |
| S (organic) | 0.13 |
| S (inorganic) | 0.01 |
| Chlorides (as NaCl) | 0.25 |
| Other organic matter | 0.41 |
| Loss on ignition | 44.30 |

It should be noted here that aragonite has been suggested for use as a source of calcium carbonate for cement. Prior attempts at using aragonite, however, have not been attractive since more time is required, and therefore greater power expenditures must be made, in order to grind the aragonite to the same finenesses heretofore though necessary for acceptable burning of the calcareous component of the reactant mixture. It is theorized that such expenditures are required for aragonite because of its different crystalline structure and greater density than conventional calcareous materials such as limestone.

Since this invention is primarily concerned with a new source of calcium carbonate for the reactant mixture to be introduced into a rotary kiln or other reaction system, it is to be understood that any variety of other materials normally utilized as reactants for Portland cement can be incorporated into a final reactant mixture. The present invention will be described primarily in relation to a Portland cement for which a calcareous material in the form of aragonite, an argillaceous material such as clay or a clay-kaolin mixture, and minor percentages of other reactants, such as slag, form the reactants. The argillaceous and other materials can be ground to the finenesses heretofore required. Typically, the argillaceous material is ground to about 100 percent −50 mesh and 95 percent −100 mesh. Other reactants such as slag need not be ground as fine, for example, 80 percent −50 mesh.

The calcareous material, aragonite, along with the ground argillaceous and other materials, can be fed dry or in the form of a water slurry into the kiln. The water slurry usually contains about 38 percent water, but, of course, can be varied. for example, from about 35 percent to about 45 percent according to the particular conditions encountered in a given cement operation. The burning zone temperatures at which the Portland cement is manufactured are in the general range of from 2,650° F. to 2,800° F. This temperature range is a general guideline and can, of course, be varied depending upon the raw materials used and the final mix desired.

In accordance with the present invention, typical percentages of dry reactant materials contained in the original reactant mixture include generally between 73 and 80 percent aragonite, usually toward the upper end of this range. The argillaceous and other materials can be added in any desired amount to obtain the desired end properties in the Portland cement. For example, argillaceous material is typically added in the range of from 10 to 20 percent and other materials typically in amounts less than 6 percent.

When properly sized, aragonite can be introduced into a kiln without any grinding. For example, oolitic aragonite can first be screened to remove any oversize material such as +50 mesh shell fragments, or in the absence of oversized material can be used directly from the ocean for this invention. Directly from the ocean, a typical oolitic aragonite screen analysis is presented in table II.

TABLE II

Screen Analysis, Oolitic Aragonite

| U.S. Sieve No. | Weight Percent Material Retained | Cumulative Weight Percent |
|---|---|---|
| +20 | 3.0 | 3.0 |
| +30 | 3.0 | 6.0 |
| +40 | 23.0 | 29.0 |
| +50 | 25.0 | 54.0 |
| +70 | 22.0 | 76.0 |
| +100 | 12.0 | 88.0 |
| +140 | 10.0 | 98.0 |
| +200 | 2.0 | 100.0 |
| −200 | Trace | — |

It is to be understood that when the term "mesh" or "-mesh size" of a screen or sieve is utilized herein that it is to mean the standard number of the U.S. Sieve Series. When it is stated that a given weight percentage of material is +100 or +100 mesh, it means that the given weight percentage remains above or does not pass through a No. 100 U.S. Sieve Series screen. If the term −100 or −100 mesh is utilized, it means that the given percentage of material will pass through a No. 100 U.S. Sieve Series screen.

A presently preferred mode of utilizing aragonite as the calcareous component of a reactant mixture is to subject all of the aragonite, preferably oolitic aragonite, to grinding. In accord with this preferred mode, oolitic aragonite is first dredged or otherwise removed from the ocean floor. The aragonite, including any oversize material, is then introduced into a grinding unit, for example, a ball mill. In the grinding unit, the aragonite is ground to a fineness which will produce an acceptable grade of Portland cement clinker. As will be seen, the finenesses to which the aragonite must be ground are much coarser than those thought necessary for convention calcareous materials such as limestone.

Another approach is to separate the coarser particles from the raw aragonite, grind the coarser particles, and recombine the thus ground particles with the finer particles from which they were originally separated. This approach will yield a calcareous reactant material of equivalent utility to that obtained by following the preferred mode outlined above.

A preferred screen analysis of aragonite or reactant material which can produce a Portland cement clinker of acceptable grade includes 100 percent −30 mesh, 90 percent −50 mesh, 65 percent −100 mesh and 45 percent −200 mesh. A more preferable screen analysis will include 95 percent −50 mesh and 45 percent −200 mesh. An acceptable Portland cement clinker can also be obtained when the screen analysis is 100 percent −30 mesh and preferably less than 70 percent −200 mesh. Presently, the foregoing screen analyses provide the best method available to identify and define the type of particles and fineness of aragonite which can be utilized with the present invention. If the above limits are utilized, a good Portland cement clinker will be obtained.

EXAMPLES

For a better understanding of the present invention, the following examples are presented for illustrative purposes. They are intended to be exemplary only and not delimitative in any manner. All percentages used throughout this specification are percentages by weight. Mesh sizes are defined above.

EXAMPLE I

In a cement plant, oolitic aragonite which contains 97.00 percent calcium carbonate, 0.04 percent silicon dioxide, 0.02 percent $Fe_2O_3$, and 0.02 percent $Al_2O_3$ is placed in a first 9½ by 34° inch ball mill charged with 3 inch balls and a second 10 by 15½ inch ball mill also charged with 3 inch balls. The mills are fed by a screw conveyor from the raw material stockpile. The product is slit so that approximately 60 percent goes to the first mill and 40 percent goes to the second mill. The aragonite, ground at the rate of about 435.5 barrels per hour, is mixed with water and the argillaceous material. Two tanks are filled. The first tank contains about 73.8 percent calcium carbonate; the second tank contains about 87.5 percent calcium carbonate. The fineness in tank 1 is 94.1 percent −50 mesh, 76.2 percent −100 mesh, and 56.2 percent − 200 mesh. The fineness of the slurry in tank 2 is 94.3 percent −50 mesh, 74.4 percent −100 mesh, and 48.4 percent −200 mesh.

The aragonite slurry in combination with sufficient amounts of clay, kaolin and slag to produce a type I Portland cement mix are further mixed in a series of blending tanks. These reactants are further blended in a kiln feed tank. Water composes about 42.8 percent by weight of the feed tank slurry A burning zone temperature of about 2,700° to 2,750° F. is maintained at the hottest point. The blended slurry is then fed to the upper end of the kiln over a period of about 24 hours. The burn is successful. The kiln remains clear and no kiln coating is lost. The clinker forms easily and is air quenched. The feed end temperature remains constant at about 640° F.

Data obtained during the run including a screen analysis, calcium carbonate content of the calcareous feed slurry, and free lime in the clinker is presented in table III. Table IV contains a chemical analysis of the clinker obtained during the run.

TABLE III

Data From Run of Example I

| Hours After Start | % Feed Slurry Material Passing 200 mesh Screen | % $CaCo_3$ In Feed | % Free CaO In Clinker |
|---|---|---|---|
| 12 | 54.7 | 77.2 | 1.76 |
| 18 | 55.1 | 77.2 | 1.34 |
| 24 | 57.6 | 76.2 | 0.64 |
| Average | 55.7 | 77.5 | 1.37 |

Table IV

Representative Clinker Sample, Example I

| Composition | | % By Weight |
|---|---|---|
| $SiO_2$ | | 21.1 |
| $Al_2O_3$ | | 6.4 |
| $Fe_2O_3$ | | 2.2 |
| CaO | | 68.5 |
| MgO | | 1.5 |
| Other | Total: | 100.8 |
| $C_3S$ | | 72.4 |
| $C_2S$ | | 6.0 |
| $C_3A$ | | 13.1 |
| $C_4AF$ | | 6.7 |
| Other | | 1.2 |
| | Total: | 100.0 | wherein:
$C_3S$ is tricalciumsilicate,
$C_2S$ is dicalciumsilicate,
$C_3A$ is tricalciumaluminate, and
$C_4AF$ is tetracalciumaluminoferrate.

EXAMPLE II

A second run is made utilizing essentially the same input. However, this time the aragonite is not ground as finely as in example I. The calcareous slurry feed tank average fineness is 92.25 percent −50 mesh, 71.6 percent −100 mesh and 49.4 percent −200 mesh. Tables V and VI set forth the results from this run.

TABLE V

Data From example II

| Hours After Start | % Feed Slurry Material Passing 200 Mesh Screen | % $CaCO_3$ In Feed | % Free CaO In Clinker |
|---|---|---|---|
| 6 | 51.6 | 76.6 | 1.46 |
| 12 | 50.8 | 76.1 | 0.48 |
| 18 | 50.4 | 76.8 | 0.24 |
| Average | 51.5 | 76.8 | 1.52 |

TABLE VI

Representative Clinker Sample, Example II

| Composition | | % By Weight |
|---|---|---|
| $SiO_2$ | | 21.9 |
| $Al_2O_3$ | | 5.7 |
| $Fe_2O_3$ | | 2.0 |
| CaO | | 66.6 |
| MgO | | 1.5 |
| Other | | 2.3 |
| | Total: | 100.0 |
| $C_3S$ | | 65.3 |
| $C_2S$ | | 15.0 |
| $C_3A$ | | 11.7 |
| $C_4AF$ | | 6.1 |
| Other | | 1.9 |
| | Total: | 100.0 |

The advantages of the present invention will be apparent to those of ordinary skill in the art. By using aragonite, Portland cement can be manufactured omitting at least a portion of the raw material grinding step. Properly sized aragonite can be utilized without grinding. To eliminate a separation step, however, a preferred mode of operation is to grind all of the aragonite for a shorter period of time than is necessary for conventional calcareous materials. By operating within the preferred mode of operation, an estimated 60 percent of the installed equipment necessary to grind limestone to the requisite fineness can be eliminated by the use of aragonite. In a typical Portland cement plant, use of aragonite can eliminate a capital investment of over 1 million dollars in installed equipment. In addition, the power savings realized by operating 60 percent less equipment is very significant.

As is readily apparent from the foregoing disclosure, the degree to which aragonite need be ground is substantially less than normally required for conventional calcareous materials, such as limestone. Other variations of the present invention will be evident from a review of the foregoing specification. The invention, therefore, shall be limited only by the definition of the appended claims.

What is claimed is:

1. A process for producing cement comprising:
   mechanically processing aragonite to a fineness less than that necessary to successfully burn conventional calcitic materials to produce a cement clinker having a free lime content less than about 2.5 percent by weight, and
   burning the said aragonite as part of a reactant mixture containing an argillaceous material to produce a cement clinker having a free lime content less than about 2.5 percent by weight.

2. The process of claim 1 wherein said processing comprises:
   separating said aragonite to produce a first coarse portion and a second portion having said fineness, and
   thereafter combining said second portion without grinding with said argillaceous material and burning the resultant mixture.

3. The process of claim 2 further comprising:
   grinding said first coarse portion to said fineness,
   combining said first portion with said argillaceous material and burning the resultant mixture.

4. The process of claim 1 wherein said processing comprises:
   grinding aragonite to said fineness.

5. The process of claim 4 wherein said aragonite is oolitic aragonite.

6. The process of claim 5 wherein said fineness includes less than about 70 percent −200 mesh material.

7. The process of claim 6 wherein said fineness includes at least 90 percent −50 mesh material.

8. The process of claim 7 wherein said fineness includes 100 percent −30 mesh and at least 95 percent −50 mesh material.

9. The process of claim 5 wherein said free lime content is less than about 2.0 percent by weight.

10. The process of claim 9 wherein said free lime content is less than about 1.5 percent by weight.

11. The process of claim 10 wherein said free lime content is less than about 1.0 percent by weight.

12. The process of claim 5 wherein said fineness comprises a degree substantially coarser than required to successfully burn limestone.

13. A method for preparing a calcareous material for the production of cement comprising:
    removing aragonite from the ocean floor,
    separating said aragonite to form a portion composed of larger particles and a portion composed of smaller particles,
    grinding the larger particles to a greater fineness,
    combining the ground larger particles and the smaller particles to form a calcareous reactant material for production of cement.

14. The method of claim 13 wherein said larger particles are at least −30 mesh.

15. The method of claim 14 wherein said larger particles are ground to at least 90 percent −50 mesh.

16. The method of claim 13 wherein said larger particles are at least +50 mesh.

17. The method of claim 16 wherein the larger particles are ground to at least 90 percent −50 mesh.

18. The method of claim 17 wherein the larger particles are ground to at least 95 percent −50 mesh.

19. The method of claim 13 wherein said larger particles are ground to at least 95 percent −50 mesh.

20. The method of claim 14 wherein said calcareous material is separated and ground to provide a reactant material of at least 90 percent −50 mesh.

21. The method of claim 20 wherein the reactant material is at least 45 percent −200 mesh.

22. The method of claim 21 wherein the reactant material is at least 65 percent −100 mesh.

23. The method of claim 22 wherein 100 percent of the reactant material is −30 mesh.

24. The method of claim 20 wherein said aragonite is separated and ground to provide a reactant material of 100 percent −50 mesh.

25. In the process for producing cement including the steps of combining a calcareous material with finely ground argillaceous material to form a reactant mixture, burning the reactant mixture in a kiln to form cement clinker, and grinding the clinker to produce cement, the improvement comprising:
    introducing aragonite as at least a portion of the calcareous material into the kiln without grinding.

26. The process of claim 25 comprising introducing said calcareous material into the kiln only as unground oolitic aragonite.

27. In the process of claim 25, the improvement comprising:
    prior to introducing said aragonite into the kiln,
    separating said aragonite into a portion composed of coarse particles and a portion composed of fine particles,
    grinding the portion composed of coarse particles,
    recombining the ground coarse particles with the fine particles, and
    thereafter introducing the thus processed aragonite into the kiln as part of a reactant mixture.

28. The process of claim 27 wherein at least 90 percent of said aragonite is −50 mesh.

29. The process of claim 28 wherein at least 95 percent of said aragonite is −50 mesh.

* * * * *

PO-1050
(5/69)

UNITED STATES PATENT OFFICE
CERTIFICATE OF CORRECTION

Patent No. 3,686,372        Dated August 22, 1972

Inventor(s) John C. Hiatt and John P. Luker

It is certified that error appears in the above-identified patent and that said Letters Patent are hereby corrected as shown below:

Column 3, line 24 - "though" should be --thought--.

Column 3, line 47 - after "mesh." delete "80".

Column 5, line 23 - "9 1/2 by 34° inch" should be --9 1/2' by 34'--.

Column 5, line 24 - "10 by 15 1/2 inch" should be --10' by 15 1/2'--.

Column 5, line 43 - after "slurry" insert --.--.

Column 6, line 5 - "$Al_2O_3$" should be moved into line under the heading entitled "Composition".

Column 6, line 6 - "$Fe_2O_3$" should be moved into line under the heading entitled "Composition".

Column 6, line 8 - "MgO" should be moved into line under the heading entitled "Composition".

Column 6, line 9 - delete "Total: 100.0" and insert --0.3-- under the heading entitled "% By Weight".

Column 6, line 10 - under the column entitled "% By Weight" insert --100.0--.

Column 8, line 15 - "-30" should be --+30--.

Signed and sealed this 9th day of January 1973.

(SEAL)
Attest:

EDWARD M. FLETCHER, JR.      ROBERT GOTTSCHALK
Attesting Officer              Commissioner of Patents